(12) United States Patent
Christenbury et al.

(10) Patent No.: US 7,237,589 B2
(45) Date of Patent: Jul. 3, 2007

(54) ASSEMBLY COMPRISING A RIM AND A RUN-FLAT SUPPORT

(75) Inventors: Damon Christenbury, Fountain Inn, SC (US); Jeffery Zawisza, Miland, MI (US)

(73) Assignee: Michelin Recherche et Technigue S.A., Granges-Paccot (CH)

( * ) Notice: Subject to any disclaimer, the term of this patent is extended or adjusted under 35 U.S.C. 154(b) by 0 days.

(21) Appl. No.: 11/316,109

(22) Filed: Dec. 22, 2005

(65) Prior Publication Data
US 2006/0118226 A1 Jun. 8, 2006

Related U.S. Application Data

(63) Continuation of application No. PCT/US03/19526, filed on Jun. 20, 2003.

(51) Int. Cl.
B60C 17/06 (2006.01)
(52) U.S. Cl. .................... 152/381.6; 152/520
(58) Field of Classification Search ............. 152/381.5, 152/381.6, 400, 516, 518, 520, 158
See application file for complete search history.

(56) References Cited

U.S. PATENT DOCUMENTS

| | | | |
|---|---|---|---|
| 4,295,509 A * | 10/1981 | Stein | 152/158 |
| 4,592,403 A * | 6/1986 | Stein et al. | 152/158 |
| 5,891,279 A | 4/1999 | Lacour | |
| 6,415,839 B1 | 7/2002 | Pompier | |
| 6,609,549 B2 * | 8/2003 | Abinal et al. | 152/400 |
| 6,807,993 B2 * | 10/2004 | Pompier | 152/379.3 |
| 2003/0005991 A1 | 1/2003 | Drap | |
| 2003/0221761 A1* | 12/2003 | Cowart et al. | 152/521 |
| 2005/0072504 A1* | 4/2005 | White et al. | 152/158 |

FOREIGN PATENT DOCUMENTS

| WO | WO 01/08905 | 2/2001 |
|---|---|---|
| WO | PCT/US01/42052 | 3/2002 |

OTHER PUBLICATIONS

International Search Report, PCT/US 03/19526, Mar. 12, 2004.

* cited by examiner

*Primary Examiner*—Russell D. Stormer
(74) *Attorney, Agent, or Firm*—E. Martin Remick; Frank J. Campigotto; Adam Arnold

(57) ABSTRACT

An assembly comprising a rim having a substantially cylindrical bearing surface having at least one depression therein, and an annular run-flat support mounted on the bearing surface. The radially inner surface of the support further comprising a protuberance to engage the depression in the rim, and wherein a radially innermost base portion of the support includes a plurality of substantially circumferentially oriented reinforcement elements. The reinforcement elements are axially spaced apart, and the reinforcement elements are absent in an axial portion of the base portion radially outward of the protuberance.

13 Claims, 4 Drawing Sheets

ASSEMBLY COMPRISING A RIM AND A RUN-FLAT SUPPORT

CROSS REFERENCE TO RELATED APPLICATIONS

This application is a continuation of International Application No.: PCT/US03/19526, filed 20 Jun. 2003 and published 20 Jan. 2005 in English as International Publication No. WO 2005/005171 A1.

BACKGROUND OF THE INVENTION

The present invention relates to an assembly of a rim for mounting a tire and an annular run-flat support intended for mounting on the rim. This assembly is particularly useful for extending the distance a tire may travel at reduced or even zero air pressure. In particular, the present invention relates to a run-flat support having a particular arrangement of the reinforcement elements in the radially inner portion of the run-flat support. Many solutions have been proposed for providing an annular run-flat support fixed to a wheel rim to allow extending running after a partial or total loss of air pressure—capability for extended mobility. Many of these systems include multi-piece rims or multi-piece supports and their use necessitates a complicated and time-consuming assembly process.

To overcome some of this difficulty, U.S. Pat. No. 5,891,279 describes an assembly comprising a tire, a rim having a unique profile designed to accept the tire, and a deformable, but preferably circumferentially inextensible, run-flat support ring that is slipped over an essentially cylindrical bearing surface of the rim. The base of the support ring includes essentially inextensible, circumferentially oriented reinforcement elements to resist the centrifugal forces generated by highway-speed travel. The support ring may be designed with an interference fit between the support and the bearing surface of the rim. When mounted, this interference causes a pretension in the reinforcement elements in the base of the support to resist better the centrifugal forces. The support is fixed in position laterally on one end by an axial protuberance and on the other end by one of the tire beads. The support also functions to prevent unseating of one of the bead seats in the event of a loss of inflation pressure in the tire. This type of run-flat assembly has an enormous advantage in ease of assembly and in extended mobility distance of travel when compared to many of the rigid, multi-piece supports. However, this invention can incur a penalty in excess mass for the support.

As an improvement having the possibility to reduce the mass of the run-flat support, International Application WO 01/08905 describes an assembly of a rim and an annular support element where each bead seat of the rim is capable of preventing unseating of the beads in the event of a loss of pressure without the aid of the run-flat support. Since the support no longer functions to retain one of the bead seats, this feature of the rim allows the width of the support to be "clipped" or reduced in width to reduce the mass of the support. Lateral location of the support is accomplished by a stop projecting axially from the rim that acts against one end of the support, and by an axial protuberance projecting from the radially inner face of the support that interlocks with a similarly shaped recess in the bearing surface of the rim.

As an alternative to the improvement just described, U.S. Pat. application Publication US2003/0005991 describes a similar rim and run-flat support assembly with a plurality of zones having protuberances on the bearing surface of the support but without the complementary depression in the rim. Each of these zones has a secondary circumferential reinforcement that is uncoupled from the primary circumferential reinforcement by a circumferential void that allows circumferential extension of the two reinforcements.

However, these inventions must accept a compromise in the level of lateral locating force developed when the run-flat support is mounted on the rim. This force must be sufficiently low to allow proper seating of the support during the assembly process and to allow ease of disassembly should a repair be necessary. During extended mobility operation of the assembly, the force must also be sufficiently high so that the support maintains its lateral position when the assembly is subject to lateral forces between the inside of the tire and the support, such as those that arise when the vehicle negotiates a curve. If the locating force is insufficient, the support may move laterally and result in a reduction of handling performance under extended mobility operating conditions. Even when these designs develop an acceptable lateral locating force, experience has shown that the tensile stresses in the reinforcement elements may be unevenly distributed, especially in the zone immediately outward of the locating protuberance.

SUMMARY OF THE INVENTION

The present invention improves upon the aforementioned designs by providing an assembly of a rim and a run-flat support where the support is mounted on the rim by an operation of translation of the support relative to the rim. The lateral fixation of the support is accomplished by means of a protuberance on the support that cooperates in an interlocking fashion with a complementary depression in the rim. In particular, the base of the support contains a reinforcement structure where the reinforcing elements are axially spaced to preclude the situation where a reinforcement element forms an overlap with certain zones of the base portion. The invention comprises:

An assembly comprising a rim having a substantially cylindrical bearing surface having at least one depression therein, and an annular run-flat support mounted on said bearing surface; the radially inner surface of said support further comprising a protuberance to engage said depression in said rim, and wherein a radially innermost base portion of said support includes a plurality of substantially circumferentially oriented reinforcement elements, said reinforcement elements being axially spaced apart, and wherein said reinforcement elements are absent in an axial portion of said base portion radially outward of said protuberance.

The absence of reinforcing elements in the zone radially outward of the protuberance permits the reinforcing elements to develop a more uniform tensile stress to prevent rotation of the support relative to the rim. A more uniform tensile stress can improve the durability of the reinforcement during the life of the support. Furthermore, the absence of the reinforcement elements in the zone outward of the protuberance facilitates flexure of the support base in the zone of the protuberance and improves the ease of mounting of the support.

During the mounting of the support, the support translates over the bearing surface of the rim. When the protuberance contacts the bearing surface, a significant radial interference exists. That portion of the base of the support containing the protuberance must deform radially to allow continued translation of the support to its final, mounted position. If the base of the support contains reinforcement elements in the immediate area of the protuberance, then this deformation will be restricted. Therefore, another advantage of the invention is to permit the localized deformation of the base of the support that, in turn, facilitates mounting and dismounting of the support on the rim.

In another version of the invention, both the base of the run-flat support and the bearing surface of the rim are each divided into at least two zones of different diameter connected by a transition zone. This geometry allows initially for a radial clearance or gap between the support and the bearing surface of the rim. However, when the support is in its final position, the desired interference fit exists in each of the zones. Thus, the desired pretension of the reinforcement elements is developed and ease of mounting is improved.

In this version of the assembly, the base portion of the support has an axial width LS and further comprises a first axial section laving a width L1 and a radially inner diameter D1 and a second axial section having a width L2 and a radially inner diameter D2 greater than the diameter D1, and a tapered transition section located between said first and second axial sections, and the bearing surface of the rim comprises a first axial section having a width L3 and a diameter D3 and a second axial section having a width L4 and a diameter D4 greater than the diameter D3, and a tapered transition section spaced between said first and second axial sections.

The desired interference fit is obtained when the diameter D3 of the rim is greater than the diameter D1 of the support, and/or when the diameter D4 of the rim is greater than the diameter D2 of the support.

BRIEF DESCRIPTION OF THE SEVERAL VIEWS OF THE DRAWINGS

The characteristics and advantages of the invention will become apparent on reading an example embodiment of the run-flat support assembly and support reinforcement according to the invention with reference to the appended drawing, in which.

DETAILED DESCRIPTION OF THE INVENTION

Figure 1:
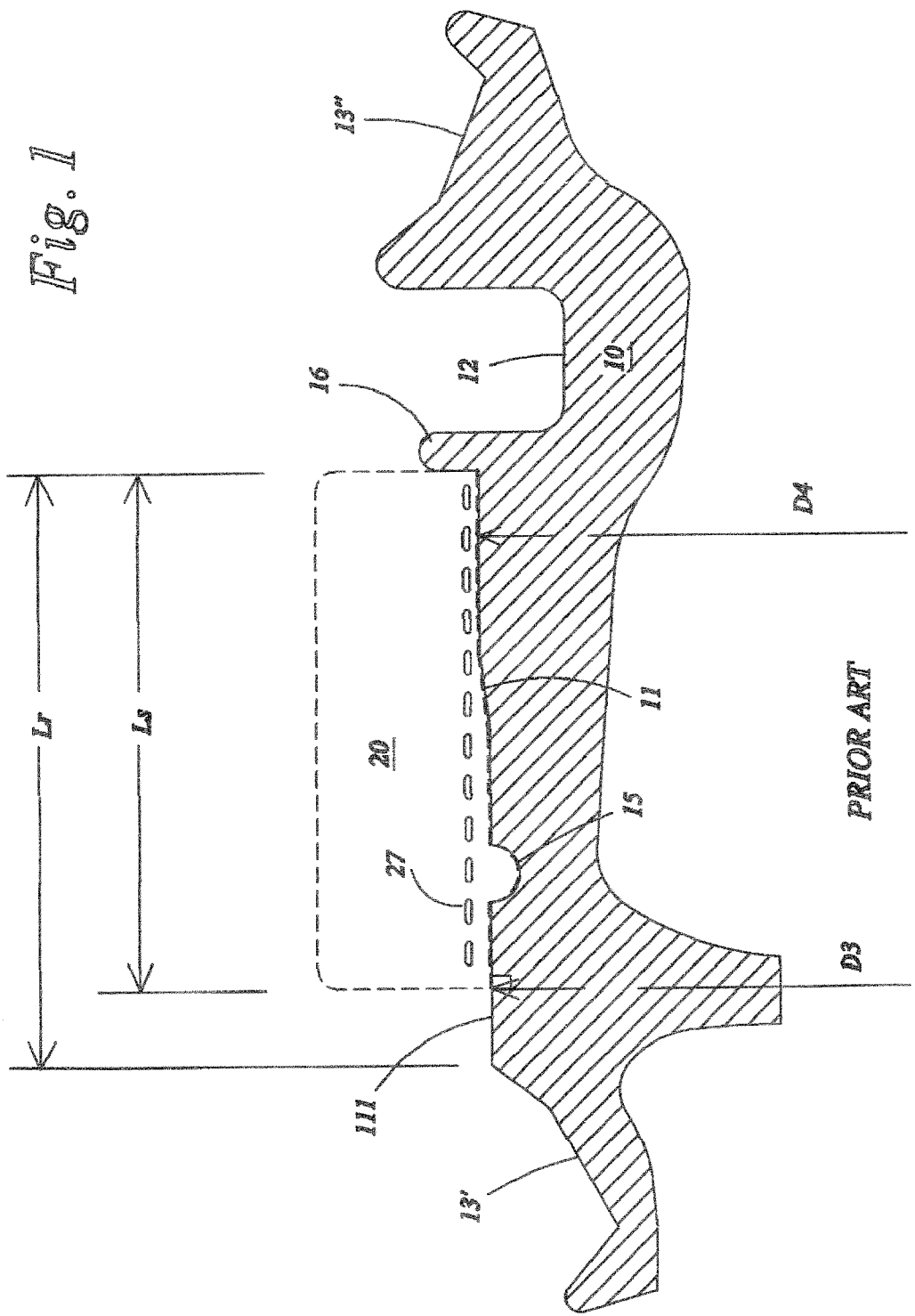
FIG. 1 depicts a cross section view through a meridian showing a schematic representation of an assembly of a run-flat support mounted on a rim, according to the prior art.

FIG. 1 depicts an assembly comprising a rim 10 and a run-flat support 20. The rim 10 has been adapted to accept a one-piece annular support 20. This necessitates a unique design for the tire, the rim, and the run-flat support. As shown, the rim 10 has two bead seats 13', 13" having unequal diameters. In particular, the diameter of the first bead seat 13' is less than the diameter of the second seat 13". The rim further comprises at least one mounting well 12 to facilitate mounting of the second bead of the tire on the rim 10 and a positioning stop 16 to limit the axial location of the run-flat support 20. The central portion 11 of the rim 10 serves as a bearing surface 111 to accept the run-flat support 20. As depicted in FIG. 1 the bearing surface 111 has a width Lr. The bearing surface further has a stepped shape to facilitate mounting of the support. That is to say, the bearing surface 111 has a first zone "I" of diameter D3 adjacent to the lesser diameter bead seat 13', a second zone "II" of diameter D4 adjacent to the mounting well 12, and a transition zone therebetween. The first zone "I" of the bearing surface 111 has a circumferential depression 15 approximately centered in the first portion of the bearing surface 111. The depression 15 engages a complementary protuberance 25 in the base of the support 20.

Figure 2:
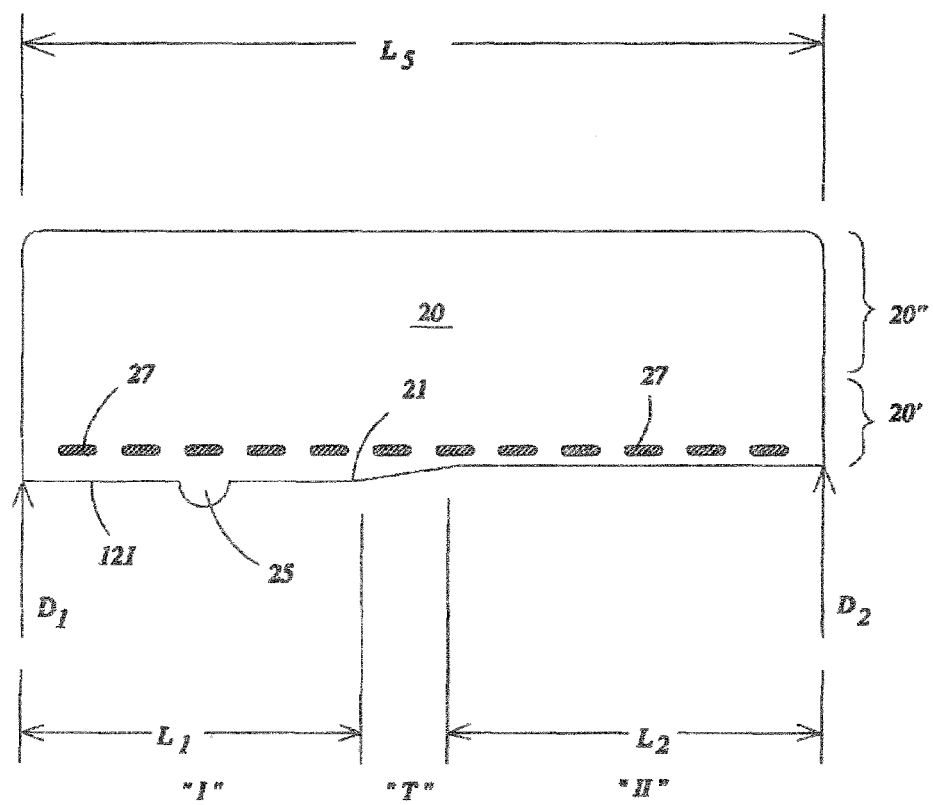
FIG. 2 depicts a cross section view through a meridian of a run-flat support 20 having a reinforcement and an interlocking protuberance for lateral fixation of the support, according to the prior art.

A schematic of a run-flat support 20 is shown in more detail in FIG. 2. The run-flat support 20 comprises a radially outer portion 20" adapted to contact the inside surface of the tire during deflated operation and to support the vehicle load, and a radially inner base portion 20' to cooperate with the rim 10. The run-flat support 20 has an overall width Ls. When a tire suffers a partial or complete loss of inflation pressure, the outer portion 20" eventually contacts the inside of the tread portion of the tire and supports that portion of the vehicle load previously carried by the tire. The particular type of run-flat support structure to provide such load support is outside the scope of the instant invention. By way of example, one skilled in the art knows of supports using various molded structures of resilient materials, some having rigid or flexible structures that may be monolithic, cellular, and/or foam or foam-like that contact the tire only after a sufficient loss of inflation pressure. Other known examples use resilient foams that expand following a loss of inflation pressure to fill the tire cavity and, thus, to support the load.

Figure 4:
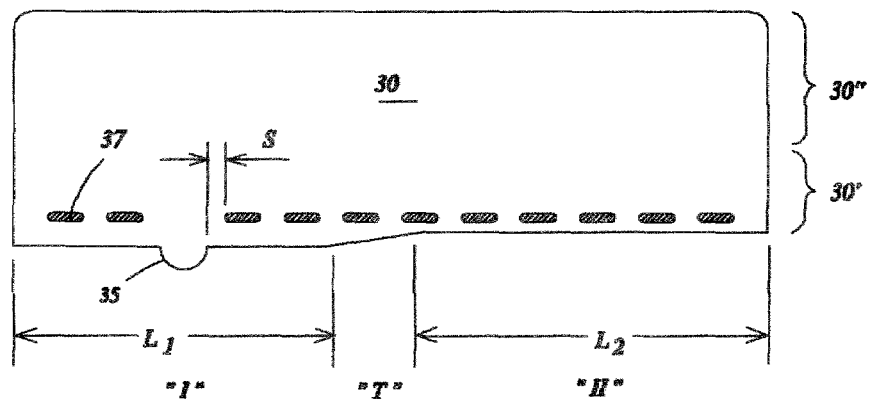
FIG. 4 depicts a run-flat support 30 according to the invention having an arrangement of the reinforcement elements optimized for ease of mounting and dismounting the support.
Figure 5:
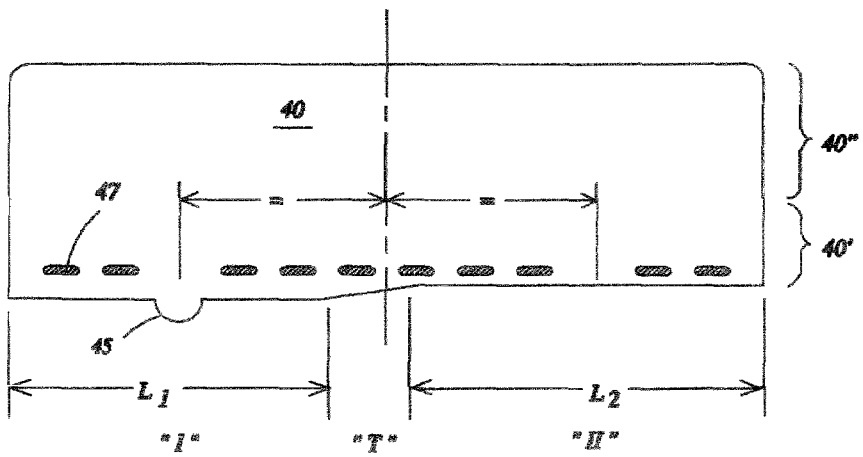
FIG. 5 depicts a run-flat support 40 according to the invention having an arrangement of the reinforcement elements further optimized for ease of manufacture.

The radially innermost portion of the support 20 is the base portion 20' having an internal structure adapted to restrain the support from axial movement and to resist centrifugal forces caused by rotation of the assembly. Thus, the base portion 20' both axially locates the support and inhibits circumferential slippage of the support relative to the rim during inflated or deflated operating modes. However, the base portion must also be optimized for ease of assembly and disassembly of the support 20 on and off the rim 10. As depicted in FIG. 2, the base portion 20' comprises three zones: a first zone "I" having a width L1 and a diameter D1, a second zone "II" having a width L2 and a diameter D2, and a third zone "T" that is a transition zone interposed between zone "I" and zone "II." The transition zone is so-named because it has a diameter that tapers from D1 to D2. The base portion 20' of the support further comprises a plurality of substantially circumferentially oriented reinforcement elements 27. The example shown in FIG. 2 shows a base portion 20' having an arrangement of uniformly spaced apart reinforcement elements 27. FIG. 4 and FIG. 5 show other examples of arrangements of the reinforcement elements 27 that are within the scope of the invention.

Figure 3A:
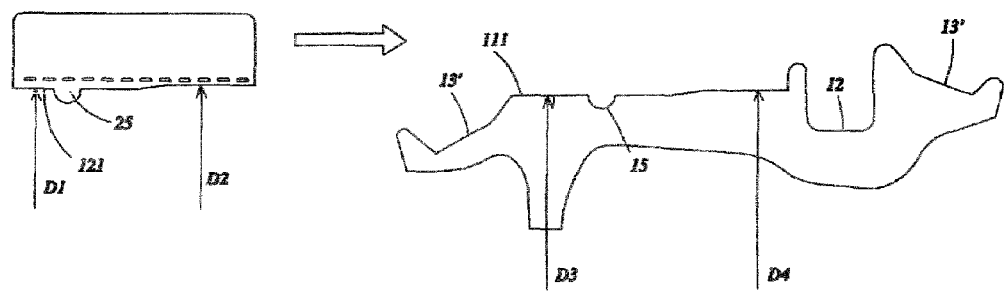
FIGS. 3A-3C depict a schematic representation of the process of mounting the run-flat support 20 on the rim by lateral translation of the support, according to the prior art.
Figure 3B:
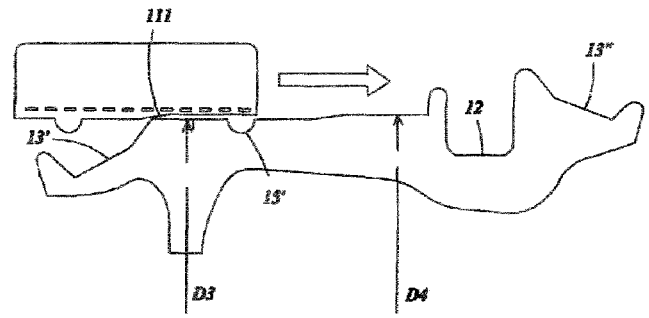
Figure 3C:
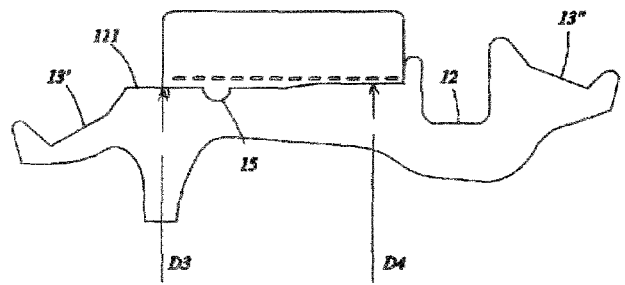

The sequence shown in FIGS. 3A, 3B, and 3C depicts a schematic of the process to assemble the deformable run-flat support 20 on the rim 10. In a first step (not shown) the deformable support 20 is first ovalized, and then placed inside the cavity of the tire. The tire and support are then translated over the first bead seat 13', as indicated by the arrow in FIG. 3A. Since the diameter of the first bead seat 13' is less than either of the inner diameters D1 or D2 of the support 20, the support 20 translates onto the rim with little effort. As the support begins to overlap the rim, as shown in FIG. 3B, it can still freely slide since the diameter D2 of zone "II" of the support is greater than the diameter D3 of zone "I" of the rim. As the translation of the support 20 continues, the overlap between the support 20 and the rim 10 now occurs within the two interference zones. That is, zone "I" of the support 20 overlaps zone "I" of the rim 10, and zone "II" of the support 20 overlaps zone "II" of the rim 10. These are interference zones for the following reasons. In zone "I," the support 20 has a diameter D1 that is less than the diameter D3 of the rim 10. Likewise, in zone "II" the support 20 has a diameter D2 that is less than the diameter D4 of the rim 10. This interference causes a desirable tensile force to develop in the reinforcement elements 27 that assists in the maintenance of the axial location of the support, resists centrifugal forces during highway speed operation, and helps prevent rotation of the support relative to the rim.

FIG. 3C shows the completed assembly of the support on the rim 10. The protuberance 25 and the depression 15 interlock to position the support laterally and to restrict lateral movement of the run-flat support 20 during operation. This interlocking contact between the support and the rim is advantageous for all support configurations, such as the aforementioned examples, and is necessary when the support has a width LS less than the width LR of the bearing surface 111 of the rim 10. The lateral location of the support 20 is further assured by the stop 16. For the examples depicted herein, the depression 15 and protuberance 25 have complementary circular cross-sections with a radius of about 4 mm and an approximate width at the surfaces 111 or 121, respectively, of about 8 mm. One skilled in the art will recognize that the depression and protuberance may have shapes other than the circular cross-section disclosed herein that can be determined without unreasonable experimentation.

The presence of the protuberance may interfere with the assembly process when a support 20 has a reinforcement configuration like that shown in FIG. 2 for the support 20. This may occur when the support has translated sufficiently to bring the protuberance in contact with the rim bearing surface 111. The protuberance projects radially inward to a diameter less than the diameter D3 of zone "I" of the rim 10. This interference between the protuberance and the rim causes a localized deformation of the base 20' of the support. However, for the arrangement of reinforcement elements shown in FIG. 2, at least one of the essentially inextensible elements 27 is located radially outward of the protuberance. The result is that the presence of the reinforcement element 27 resists the deformation caused by the protuberance 25.

FIG. 4 shows a support 30 according to the invention that provides a solution to this problem. In this embodiment of the invention, a plurality of circumferentially oriented, essentially inextensible reinforcement elements 37 is disposed in the base 30' of the support. Each of the reinforcement elements comprises a band having a width of about 6 mm. The inner surface 131 of the support 30 carries a protuberance 35 identical to the protuberance 25 just described for the support 20, also having a width of about 8 mm. The support 30 has a width L1 of zone "I" of about 26 mm.

The significant feature of the invention is an absence of reinforcement elements in the zone radially outward of the protuberance 35. For the support 30 shown in FIG. 4, one of the reinforcement elements 37 located radially outward of the protuberance 35 was removed to create a reinforcement free zone at least equal to the width of the protuberance 25. It has been found that the beneficial effect of removing the reinforcement element outward of the protuberance 35 increases when reinforcement-free zone extends beyond the width of the protuberance. This characteristic is represented in FIG. 4 by the clearance spacing "S," defined as the distance between the edge of the protuberance and the edge of the first reinforcement element 37 adjacent to the protuberance. In this instant example, the reinforcement elements 37 have a clearance spacing "S" of at least about 1 mm. Therefore, for the support 30 described herein, with a protuberance of width 8 mm and a clearance S of about 1 mm, there will be a 10 mm wide zone, centered on the protuberance, where the reinforcement elements are absent.

Figure 6:
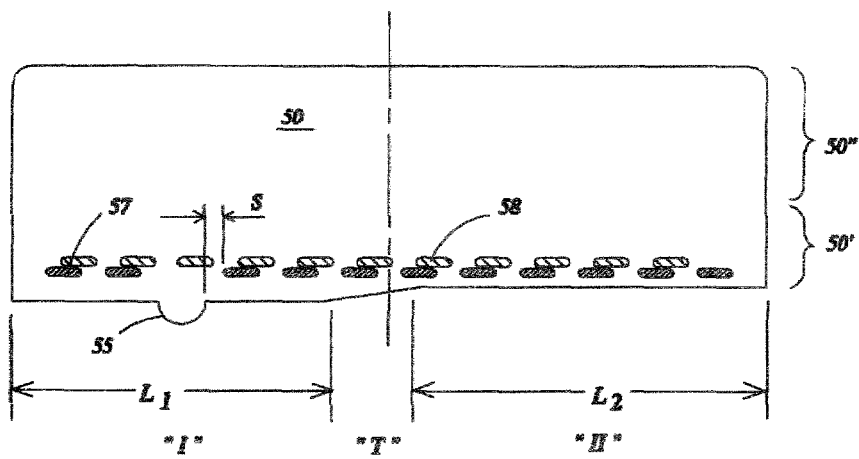
FIG. 6 depicts a run-flat support 50 according to the invention having an arrangement of at least two layers of reinforcement elelments optimized for ease of mounting and dismounting the support.

The invention, further includes a preferred arrangement of the reinforcement elements to facilitate the efficiency of the manufacturing processes. An example of a process to manufacture such a support is by injection molding of the material used for the body of the support, and where the support reinforcement is prefabricated in a separate process prior to the molding process. The prefabricated ring is sufficiently rigid so that it can be easily placed and located in a mold prior to injection of the support material. An example of a process to prefabricate the support reinforcement by filament winding is disclosed in International Application No. PCT/US01/142052. This application describes a method whereby a plurality of bands of essentially circumferential filaments is wound on a mandrel. These filaments are coupled to a plurality of transverse filaments. In this instance, "transverse" means filaments wound at a large angle relative to the circumferential direction. The transverse elements are coupled to the circumferential elements by means of suitable agents such as a polymeric film, spray, dip, powder coating, adhesive tape, or combinations thereof. The completed support reinforcement is placed in the mold prior to its closure and injection of the support material. FIG. 6 thus depicts a support ring 50 using the preferred arrangement just described and having at least two layers of reinforcement elements wherein the second layer of transverse, or angled, reinforcements 58 are coupled to the first layer of circumferentially oriented reinforcements 57.

Returning to the instant invention, the circumferential filaments are wound in layers so that each reinforcement element 47 has a tensile modulus of elasticity greater than 100 MPa. The plurality of large-angle filaments has a low tensile modulus in the circumferential direction. Commonly, large-angle filaments may comprise only a single winding. For this reason, when the low-angle filaments cross a zone where the circumferential filaments are absent, they do not inhibit the deformation of the base of the support. In this manner, the beneficial effect of the invention on assembly, disassembly, and durability of the support is not disturbed.

It can be appreciated that the reinforcement for the support 30, just described, will have a preferred orientation for insertion into the mold so that the reinforcement-free zone aligns correctly with the protuberance 35. If the prefabricated support reinforcement is incorrectly placed in the mold, for example in a reversed orientation, then the benefit of the invention will be lost. To ensure the correct orientation of the support reinforcement in the mold takes extra care and time with a resultant loss of process efficiency.

The efficiency and quality of the manufacturing process can be improved when the support reinforcement is prefabricated to include an arrangement of reinforcement elements that is symmetric about the centerline, as shown in FIG. 5. Symmetric support reinforcement avoids the necessity to place the support in the mold with a unique orientation. Therefore, the support 40 has a configuration of the circumferential elements 47 that is symmetric about the centerline of the support. As depicted in FIG. 5, this is accomplished by the suppression of at least one of the reinforcement elements 47 on the right half of the support in a mirror image to the suppression on the left had of the support. That is to say, the support reinforcement comprises two axial sections in which the reinforcement elements 47 are absent, and each of the axial sections is offset an equal distance from the centerline of the support reinforcement. The offset distance corresponds to the axial location of the radial protuberance 45 in the finished support. It is immediately apparent that support reinforcement for the support 40 can be placed in the mold without regard to orientation.

Although preferred embodiments of the invention have been described using specific terms, devices, and methods, such description is for illustrative purposes only. It is to be understood that changes and variations may be made by those of ordinary skill in the art without departing from the spirit or the scope of the present invention, which is set forth in the following claims. In addition, it should be understood that aspects of the various embodiments may be interchanged, in whole or in part. Therefore, the spirit and scope of the appended claims should not be limited to the description of the preferred versions contained therein.

The invention claimed is:

1. An assembly comprising;
   a rim having a substantially cylindrical bearing surface having at least one depression therein, and
   an annular run-flat support mounted on said bearing surface; the radially inner surface of said support further comprising a protuberance to engage said depression in said rim, and wherein, a radially innermost base portion of said support includes a plurality of substantially circumferentially oriented reinforcement elements, said reinforcement elements being axially spaced apart, and said substantially circumferentially oriented reinforcement elements are absent in an axial portion of said base portion radially outward of said protuberance.

2. The assembly of claim 1, wherein said base portion of said support has an axial width LS and further comprises a first axial section having a width LI and a radially inner diameter D1 and a second axial section having a width L2 and a radially inner diameter D2 greater than said diameter D1, and a tapered transition section located between said first and second axial sections.

3. The assembly of claim 2, wherein said bearing surface of said rim comprises a first axial section having a diameter D3 and a second axial section having a diameter D4 greater than said diameter D3, and a tapered transition section spaced between said first and second axial sections, and wherein said diameter D3 is greater than said diameter D1 of said support and said diameter D4 is greater said diameter D2 of said support.

4. The assembly of claim 2, wherein said first axial section further comprises said protuberance and at least one of said reinforcement elements positioned proximately to each lateral side of said protuberance.

5. The assembly of claim 1, wherein the width of said axial portion of said base portion radially outward of said protuberance wherein said reinforcement elements are absent is at least equal to the width of said protuberance.

6. The assembly of claim 1, wherein said base portion further comprises two axial sections in which said reinforcement elements are absent, each of said sections being offset an equal distance from the centerline of said reinforcement, and said offset distance corresponds to the axial location of said radial protuberance.

7. The assembly of claim 1, wherein the distance between the lateral edge of said protuberance and the lateral edge of an adjacent reinforcement element is at least 1 mm.

8. The assembly of claim 1, wherein said axial width LI of said first axial section is about 26 mm.

9. The assembly of claim 5, wherein said protuberance is axially centered in said first axial section.

10. The assembly of claim 1 wherein said protuberance has a width of about 8 mm.

11. The assembly of claim 1, wherein each of said reinforcement elements has a width of about 6 mm.

12. The assembly of claim 1, wherein each of said reinforcement elements comprises a winding of reinforcement bands and said reinforcement elements have a tensile modulus of elasticity of at least 100 MPa.

13. The assembly of claim 1, further comprising at least a first and a second layer of axially spaced apart and substantially parallel reinforcement elements, said reinforcement elements in said second layer being oriented at an angle greater than zero degrees with respect to the circumferential direction and said second layer is coupled to said first layer.

* * * * *